(12) United States Patent
Nishikawa et al.

(10) Patent No.: US 7,686,394 B2
(45) Date of Patent: Mar. 30, 2010

(54) VEHICLE SEATS

(75) Inventors: Yusuke Nishikawa, Kasugai (JP);
Satoru Kuno, Aichi-ken (JP); Tokuyuki Nishikawa, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 13 days.

(21) Appl. No.: 12/062,086

(22) Filed: Apr. 3, 2008

(65) Prior Publication Data
US 2008/0252128 A1 Oct. 16, 2008

(30) Foreign Application Priority Data
Apr. 6, 2007 (JP) .............................. 2007-100609

(51) Int. Cl.
*B60N 2/22* (2006.01)
*B60N 2/23* (2006.01)
(52) U.S. Cl. ................. 297/284.3; 297/284.1; 297/353; 297/354.11
(58) Field of Classification Search ............. 297/284.3, 297/284.1, 354.11, 353
See application file for complete search history.

(56) References Cited

U.S. PATENT DOCUMENTS

| | | | | |
|---|---|---|---|---|
| 2,859,797 A | * | 11/1958 | Mitchelson | 297/61 |
| 4,626,028 A | * | 12/1986 | Hatsutta et al. | 297/284.1 X |
| 4,641,884 A | * | 2/1987 | Miyashita et al. | 297/284.3 X |
| 5,058,953 A | * | 10/1991 | Takagi et al. | 297/284.1 X |
| 5,112,109 A | * | 5/1992 | Takada et al. | 297/343 |
| 5,120,109 A | * | 6/1992 | Rangoni | 297/284.3 |
| 5,123,706 A | * | 6/1992 | Granzow et al. | 297/452.18 |
| 5,171,062 A | | 12/1992 | Courtois | |
| 5,370,443 A | * | 12/1994 | Maruyama | 297/284.1 |
| 5,516,195 A | * | 5/1996 | Canteleux | 297/284.1 |
| 5,836,647 A | * | 11/1998 | Turman | 297/284.3 X |
| 5,836,651 A | * | 11/1998 | Szerdahelyi et al. | 297/284.1 X |
| 6,082,823 A | * | 7/2000 | Aumont et al. | 297/284.1 X |
| 6,095,611 A | * | 8/2000 | Bar et al. | 297/284.3 X |
| 6,601,918 B2 | | 8/2003 | Mattsson | |

(Continued)

FOREIGN PATENT DOCUMENTS

JP 10-086720 4/1998

(Continued)

OTHER PUBLICATIONS

English language Abstract of JP 2000-025498.

(Continued)

*Primary Examiner*—Rodney B White
(74) *Attorney, Agent, or Firm*—Greenblum & Bernstein, P.L.C.

(57) ABSTRACT

A vehicle seat may include a seat back that includes an upper half corresponding to a shoulder portion of a passenger, a lower half corresponding to a waist portion of the passenger, at least one angular adjustment mechanism and at least one upper half height adjustment mechanism. The at least one angular adjustment mechanism is disposed between the upper half and the lower half and is arranged and constructed to tilt the upper half back and forth relative to the lower half to intermediately fold the seat back at an intermediate folding position. The at least one upper half height adjustment mechanism is disposed in the upper half and is arranged and constructed to vertically move the upper half relative to the intermediate folding position.

7 Claims, 5 Drawing Sheets

U.S. PATENT DOCUMENTS

| | | | |
|---|---|---|---|
| 7,097,246 B2 * | 8/2006 | Sedlatschek et al. | 297/284.3 |
| 7,374,245 B2 * | 5/2008 | Tanaka et al. | 297/343 |
| 7,543,888 B2 * | 6/2009 | Kuno | 297/353 |
| 7,547,068 B2 * | 6/2009 | Davis | 297/353 |
| 2006/0186719 A1 * | 8/2006 | Davis | 297/353 |

FOREIGN PATENT DOCUMENTS

| | | |
|---|---|---|
| JP | 2000-025498 | 1/2000 |
| JP | 2001-95645 | 4/2001 |

OTHER PUBLICATIONS

English language Abstract of JP 10-086720.
English language Abstract of JP 2001-95645.
U.S. Appl. No. 12/061,115 to Kuno, filed Apr. 3, 2008.

* cited by examiner

VEHICLE SEATS

This application claims priority to Japanese patent application serial number 2007-100609, the contents of which are incorporated herein by reference.

BACKGROUND OF THE INVENTION

The present invention relates to vehicle seats. More particularly, the present invention relates to vehicle seats each having a seat back.

A vehicle seat having a seat back that is divided to an upper half and a lower half is already known. In the vehicle seat, the upper half is constructed to be tilted relative to the lower half, so that a forward and backward tilting angle of the upper half relative to the lower half can be changed. That is, the seat back is constructed to be intermediately folded. Further, the upper half is constructed to be vertically moved relative to the lower half, so that a vertical position of the upper half relative to the lower half can be changed. Such a vehicle seat is taught, for example, by Japanese Laid-Open Patent Publication Number 2000-25498.

In particular, in the known vehicle seat, the seat back upper half is movably connected to the seat back lower half via connecting stays. Therefore, a vertical position of the upper half can be adjusted by vertically moving the upper half relative to the connecting stays. Further, an upper half tilting device is embedded in the upper half. Therefore, the upper half can be tilted relative to the connecting stays (the lower half).

However, in the known vehicle seat, when the upper half is raised or upwardly moved, a tilting position of the upper half can be dependently raised or upwardly moved because the upper half tilting device is embedded in the upper half. Therefore, the upper half cannot be tilted forwardly relative to the lower half 2L in large radius of rotation. In other words, the upper half cannot be sufficiently moved forwardly unless the upper half is tilted forwardly over a large angle range.

In view of the problems detailed above, there is a need in the art for an improved vehicle seat.

BRIEF SUMMARY OF THE INVENTION

For example, in one aspect of the present invention, a vehicle seat may include a seat back that includes an upper half corresponding to a shoulder portion of a passenger, a lower half corresponding to a waist portion of the passenger, at least one angular adjustment mechanism and at least one upper half height adjustment mechanism. The at least one angular adjustment mechanism is disposed between the upper half and the lower half and is arranged and constructed to tilt the upper half back and forth relative to the lower half to intermediately fold the seat back at an intermediate folding position. The at least one upper half height adjustment mechanism is disposed in the upper half and is arranged and constructed to vertically move the upper half relative to the intermediate folding position.

According to the vehicle seat thus constructed, the at least one angular adjustment mechanism allows the seat back upper half to tilt forwardly relative to the seat back lower half, thereby intermediately folding the seat back at the intermediate folding position. Therefore, the seat back can be adjusted such that the passenger can look forward while keeping a comfortable sitting position in which abdominal regions of the passenger are not pressed into a strained condition.

In addition, the upper half of the seat back can be vertically moved relative to the lower half of the seat back, so that the overall length of the seat back can be changed. Therefore, the seat back can be preciously adjusted in order to fit the body size of the passenger. Further, the upper half can be vertically moved relative to the lower half without moving the intermediate folding position of the seat back. Therefore, when the upper half is moved upwardly in order to extend the overall length of the seat back, the upper half can be tilted forwardly relative to the seat back lower half in large radius of rotation.

In one embodiment, the at least one angular adjustment mechanism is formed by rotatably connecting an upper frame corresponding to the upper half and a lower frame corresponding to the lower half to each other via hinge connection. Further, the at least one upper half height adjustment mechanism is formed by dividing the upper frame to a hinge-connection portion that is hinge connected to the lower frame and a vertical moving portion that is capable of vertically moving relative to the hinge-connection portion. Thus, the upper half can be vertically moved relative to the intermediate folding position.

In another embodiment, the vehicle seat may further include an intermediate folding position adjustment mechanism that is disposed in the lower half. The intermediate folding position adjustment mechanism is arranged and constructed to vertically move the intermediate folding position relative to the lower half.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 5.

First Detailed Representative Embodiment

A first detailed representative embodiment of the present invention will be described with reference to FIGS. 1 to 4. However, before describing the first representative embodiment in detail, a summary of the representative embodiment will be provided.

Figure 1:
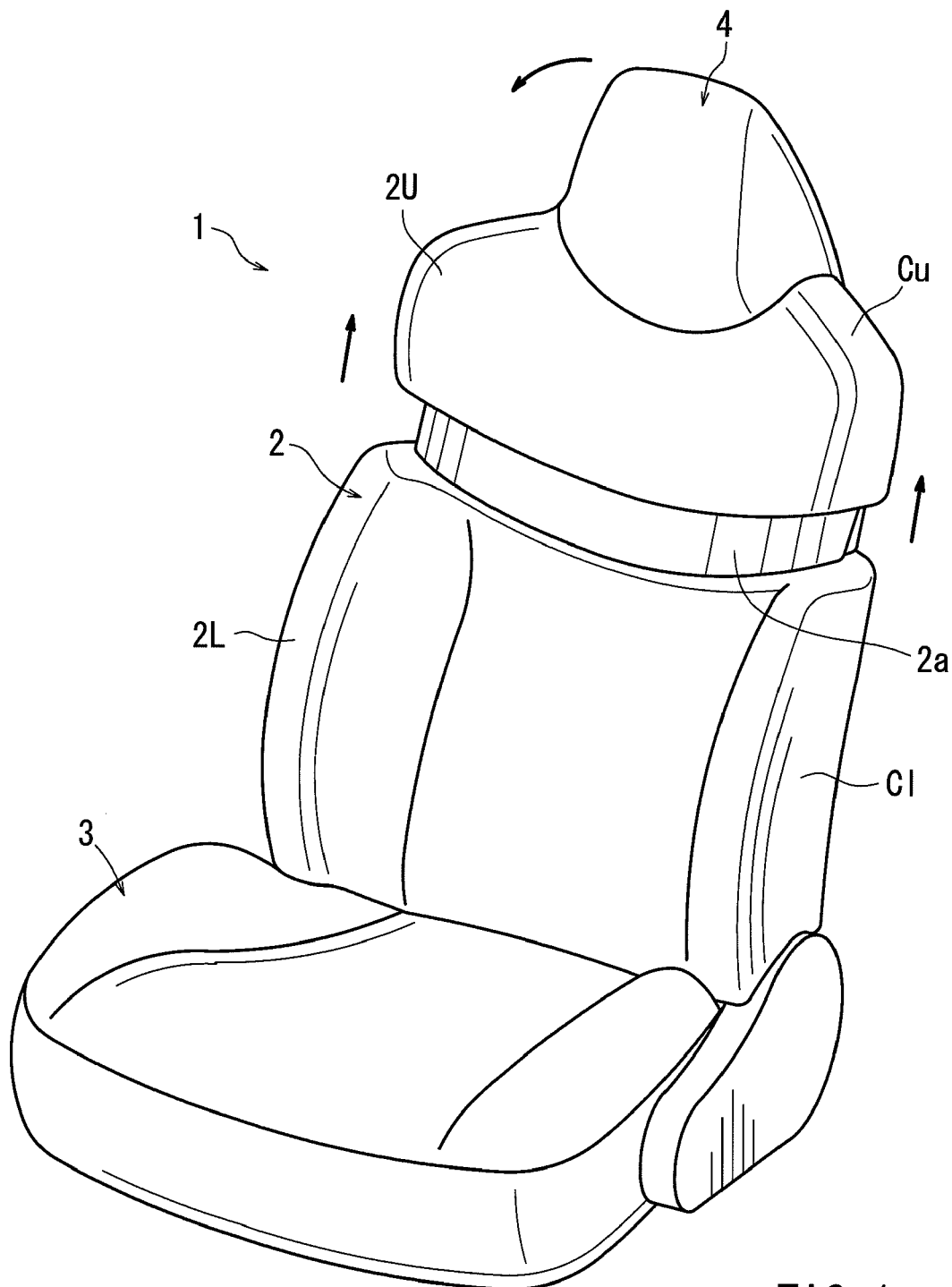
FIG. 1 is a perspective view of a vehicle seat according to a first representative embodiment of the present invention, which schematically illustrates motion of an upper half of a seat back.

As shown in FIG. 1, a representative vehicle seat 1 may preferably include a seat back 2 having a head rest 4 and a seat cushion 3. The seat back 2 is rotatably connected to the seat cushion 3 via a seat reclining device (not shown), so that a tilting angle of the seat back 2 relative to the seat cushion 3 can be adjusted by operating the seat reclining device (i.e., by switching the seat reclining device between a locked condition and an unlocked condition). As will be appreciated, the seat reclining device can be changed between the locked condition and the unlocked condition by simply operating an operation lever (not shown) that is attached to a side portion of the seat cushion 3.

As shown in FIG. 1, the seat back 2 is divided to an upper half 2U integrally having the head rest 4 and a lower half 2L, which respectively correspond to a shoulder portion (a head portion) and a waist portion of a passenger. Further, angular adjustment mechanisms are disposed between the upper half 2U and the lower half 2L, so as to change a forward and backward tilting angle of the upper half 2U relative to the lower half 2L. As shown by broken lines in FIG. 1, each of the angular adjustment mechanisms allows the seat back upper half 2U to tilt forwardly relative to the seat back lower half 2L, thereby intermediately folding the seat back 2 at an intermediate folding position. Therefore, the seat back upper half 2U can be, for example, tilted forwardly while the seat back lower half 2L is tilted rearwardly, so that the seat back 2 can be bent to a V-shape. In such a condition of the seat back 2, the passenger can look forward while keeping a comfortable sitting position in which abdominal regions of the passenger are not pressed.

Further, upper half height adjustment mechanisms are provided to the upper half 2U of the seat back 2, in order to vertically move the upper half 2U (the head rest 4) relative to the lower half 2L. As shown by solid lines in FIG. 1, each of the upper half height adjustment mechanisms allows the seat back upper half 2U (the head rest 4) to move upwardly relative to the lower half 2L, thereby extending an overall height or length of the seat back 2. Therefore, the overall length of the seat back 2 can be adjusted for body size of the passenger when the upper half 2U is raised by the upper half height adjustment mechanisms.

Further, the overall length of the seat back 2 can be extended by upwardly moving the seat back upper half 2U without raising or upwardly moving the intermediate folding position thereof. Therefore, if the upper half 2U is moved upwardly in order to extend the overall length of the seat back 2, the upper half 2U can be tilted forwardly relative to the seat back lower half 2L in large radius of rotation. As a result, the seat back 2 may widely be adjusted so as to conform to various sitting positions of the passenger based upon the body size thereof.

The seat back lower half 2L is shaped so as to have an upper reduced neck portion 2a. The neck portion 2a is telescopically coupled to the seat back upper half 2U, so as to be exposed when the upper half 2U is moved upwardly. Therefore, when the upper half 2U is moved upwardly relative to the lower half 2L, inner structure of the seat back 2 can be prevented from being exposed. As will be recognized, the upper half 2U and the lower half 2L are respectively covered with covering members Cu and Cl.

The first detailed representative embodiment will now described in detail.

Figure 2:
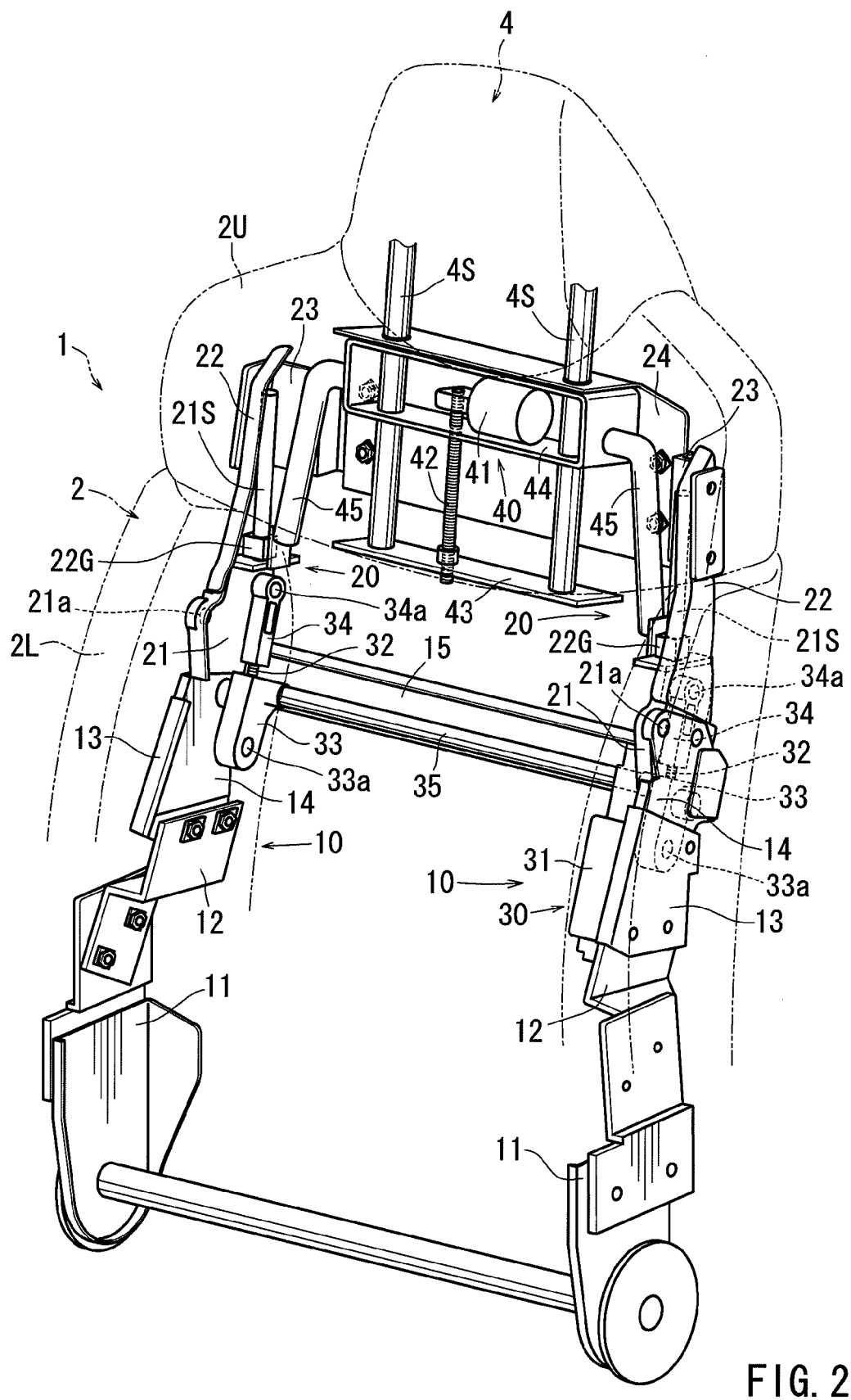
FIG. 2 is a perspective view of the vehicle seat, which illustrates a framework or inner structure thereof.

As shown in FIG. 2, the seat back 2 may preferably include a pair of steel upper frames (a pair of frame assemblies) 10 and a pair of steel lower frames (a pair of frame assemblies) 20 that respectively correspond to the seat back upper half 2U and the seat back lower half 2L. The upper and lower frames 10 and 20 are rotatably connected to each other via hinge connection, thereby forming the angular adjustment mechanisms that allows the upper half 2U to tilt back and forth relative to the lower half 2L. Thus, the seat back 2 can be intermediately folded via the angular adjustment mechanisms. Further, the hinge connection corresponds to the intermediate folding position of the seat back 2.

Each of the upper frames 20 is composed of a rotatable plate 21 and a liftable plate 22 that is capable of vertically moving relative to the rotatable plate 21. The rotatable plate 21 and the liftable plate 22 may constitute a substantial portion of each of the upper half height adjustment mechanisms that allows the upper half 2U to vertically move relative to the lower half 2L. Thus, upon upward movement of the liftable plates 22 of the upper frames 20, the upper half 2U is moved upwardly relative to the lower half 2L, so that the overall length of the seat back 2 can be extended. Further, the rotatable plate 21 and the liftable plate 22 will be respectively referred to as a hinge-connection portion and a vertical moving portion.

Figure 4:
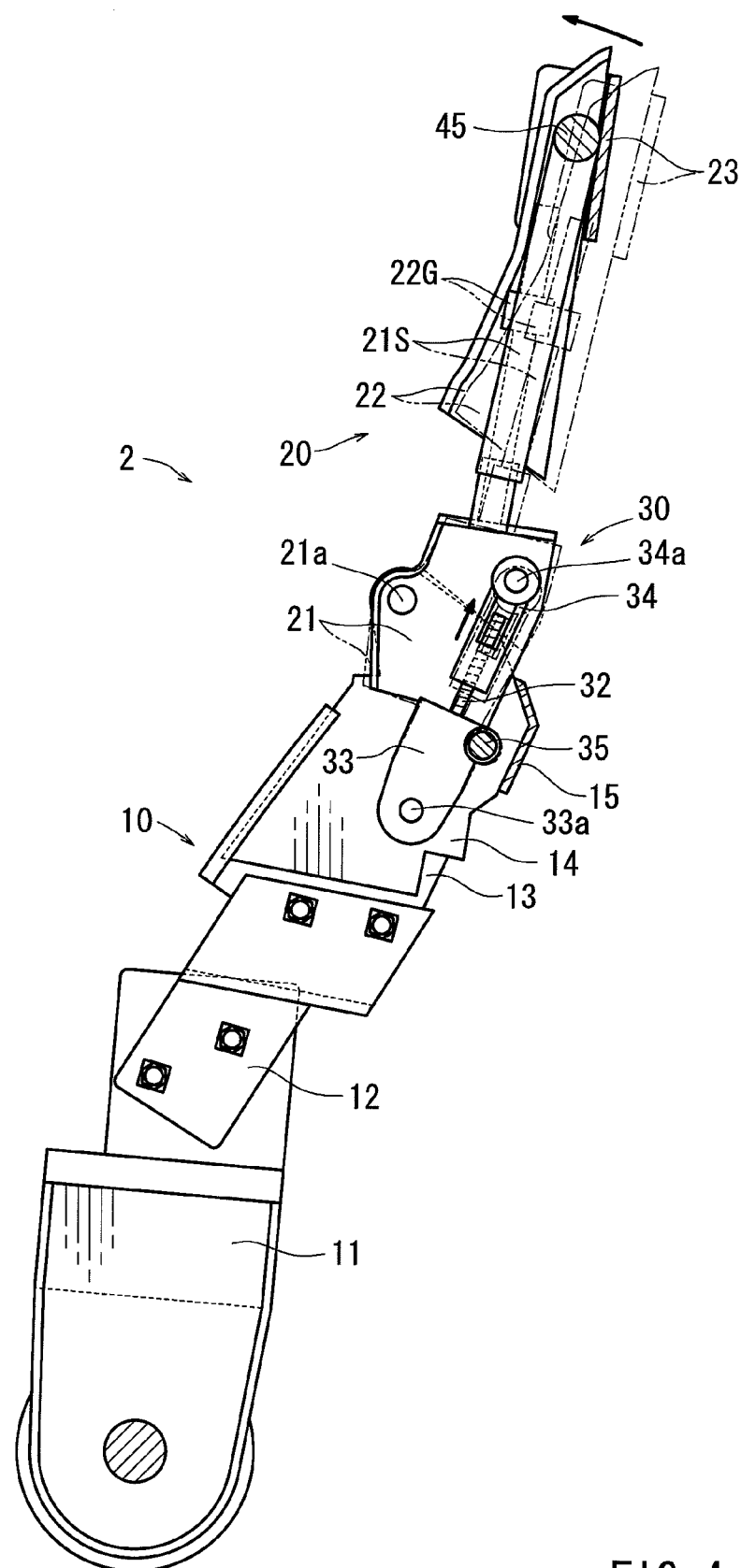
FIG. 4 is a cross-sectional view taken along line IV-IV in FIG. 3, which illustrates motion of the seat back upper half for intermediately folding the seat back.

Conversely, each of the lower frames 10 is composed of a base plate 11, a shouldered bracket plate 12, an intermediate plate 13 and a support plate 14. These plates 11, 12, 13 and 14 are positioned in series in this order from the bottom and are rigidly integrally connected to each other. Further, as shown in FIG. 4, the support plates 14 of the lower frames 10 are transversely rigidly connected to each other via a lateral reinforcement plate 15. Thus, the lower frames 10 are rigidly integrated with each other, thereby forming a U-shaped frame body having increased torsional stiffness.

The rotatable plates 21 of the upper frames 20 are respectively rotatably or pivotally connected (hinge connected) to the support plates 14 of the lower frames 10 via hinge pins 21a. As will be appreciated, connection of the rotatable plate 21 and the support plate 14 via the hinge pins 21a corresponds to the hinge connection of the upper and lower frames 10 and 20 described above. Further, the rotatable plates 21 are respectively connected to the liftable plates 22 via a guide mechanism, so that the liftable plates 22 are capable of moving vertically (i.e., in a lengthwise direction of the seat back 2) relative to the rotatable plates 21. As shown in, for example, FIG. 3, the guide mechanism is composed of vertical guide rods 21S that are respectively vertically positioned and are fixedly connected to the rotatable plates 21, and slide blocks 22G that are respectively connected to the liftable plates 22 and are slidably coupled to the guide rods 21S. Thus, the liftable plates 22 are capable of vertically moving relative to the rotatable plates 21 along the guide rods 21S. In addition, the liftable plates 22 are transversely rigidly connected to each other via a lateral reinforcement plate 24 and two shouldered bracket plates 23 that are attached to both ends thereof. Therefore, the upper frames 20 are rigidly integrated with each other, thereby forming a U-shaped frame body having increased torsional stiffness. Also, the upper frames 20 thus assembled are capable of integrally moving vertically in synchronism with each other.

An upper half tilting device 30 is disposed between the seat back upper and lower halves 2U and 2L. The upper half tilting device 30 is arranged and constructed to tilt the upper half 2U relative to the lower half 2L. The upper half tilting device 30 is composed of a drive motor 31, a pair of screw rods 32, a pair of guide members 33, a pair of operation members 34 and a lateral coupling shaft 35.

The guide members 33 are respectively rotatably attached to the support plates 14 (the lower frames 10) via pins 33a, so as to rotate forward and backward thereabout. The screw rods 32 are respectively rotatably coupled to the guide members 33. In particular, lower portions of the screw rods 32 are respectively embedded in the guide members 33 such that upper portions of the screw rods 32 extend vertically upwardly therefrom. The screw rods 32 thus arranged are threadably coupled to each other via the lateral coupling shaft 35, so as to rotate in synchronism with each other. The drive motor 31 may preferably be attached to one of the guide members 33 (the right guide member 33 as seen in the drawings), so as to rotate the corresponding screw rod 32. As a result, the drive motor 31 is capable of rotating with the right guide member 33 with respect to the support plates 14 (the lower frames 10) via the pins 33a. Further, the drive motor 31 is electrically connected to a switch (not shown) that is attached to an appropriate portion of the vehicle seat 1. As will be appreciated, the switch may preferably be constructed to turn on and off the drive motor 31 or to change rotation of direction (normal or reverse direction) of the drive motor 31.

The operation members 34 respectively threadably engage the upwardly extended upper portions of the screw rods 32. Also, upper portions of the operation members 34 are respectively rotatably attached to the rotatable plates 21 (the upper frames 20) via pins 34a, so as to rotate forward and backward thereabout. Therefore, the operation members 34 are respectively capable of vertically moving along the screw rods 32 when the screw rods 32 are rotated by the drive motor 31. As will be appreciated, the screw rods 32 and the operation members 34 are respectively threaded such that the operation members 34 can respectively move in the same direction along the screw rods 32 when the screw rods 32 are rotated by the drive motor 31.

As shown by solid lines in FIG. 4, when the operation members 34 move upwardly along the screw rods 32 upon rotation of the screw rods 32, the rotatable plates 21 (the upper frames 20) are respectively pushed upwardly via the pins 34a, so as to be rotated forwardly about the hinge pins 21a. As a result, the seat back upper half 2U is rotated forwardly relative to the seat back lower half 2L, so that the seat back 2 can be intermediately folded. Conversely, when the operation members 34 move downwardly along the screw rods 32 upon reverse rotation of the screw rods 32, the rotatable plates 21 (the upper frames 20) are respectively pulled downwardly via the pins 34a, so as to be rotated rearwardly about the hinge pins 21a. As a result, the upper half 2U is rotated rearwardly relative to the lower half 2L, so that the seat back 2 can be intermediately unfolded.

Further, because the guide members 33 and the operation members 34 are respectively rotatably attached to the support plates 14 and the rotatable plates 21 via the pins 33a and the pins 34a, the rotatable plates 21 can be smoothly rotated forwardly and rearwardly about the hinge pins 21a. As a result, the upper half 2U can be smoothly rotated forwardly and rearwardly relative to the lower half 2L.

A head rest height adjustment mechanism is provided to the upper half 2U. The head rest height adjustment mechanism may preferably include a vertically moving device 40 that constitutes the substantial portion thereof. The vertically moving device 40 is arranged and constructed to vertically move the upper half 2U (the head rest 4) relative to the lower half 2L. As shown in FIG. 2, the vertically moving device 40 is composed of a drive motor 41, a screw rod 42, a plate-shaped lifting base (a movable component) 43, a frame-shaped main body 44 and a pair of support members 45.

The main body 44 is integrally fixedly connected to the rotatable plates 21 of the upper frame 20 via the support members 45. The main body 44 may preferably be constructed such that the drive motor 41 and the screw rod 42 can be attached thereto. The drive motor 41 is disposed on the main body 44. Further, the drive motor 41 is electrically connected to a switch (not shown) that is attached to an appropriate portion of the vehicle seat 1. As will be appreciated, the switch may preferably be constructed to turn on and off the drive motor 41 or to change rotation of direction (normal or reverse direction) of the drive motor 41.

The screw rod 42 is vertically positioned and is rotatably attached to the main body 44. An upper end of the screw rod 42 is connected to the drive motor 41, so that the screw rod 42 can be rotated when the drive motor 41 is actuated. The screw rod 42 is extended downwardly and is threadably coupled to the lifting base 43 that is positioned below the main body 44. The lifting base 43 is connected to a pair of head rest stays (head rest structural components) 4S. The head rest stays 4S are respectively vertically positioned and vertically slidably penetrate the main body 44. Therefore, the head rest stays 4S are capable of vertically moving relative to the main body 44.

Therefore, upon actuation of the drive motor 41, the screw rod 42 is rotated, so that the lifting base 43 is vertically moved along the screw rod 42. As a result, the head rest stays 4S can be vertically moved relative to the main body 44, so that the head rest 4 supported by the head rest stays 4S can be vertically moved. Therefore, height of the head rest 4 can be adjusted for the body size of the passenger.

Figure 3:
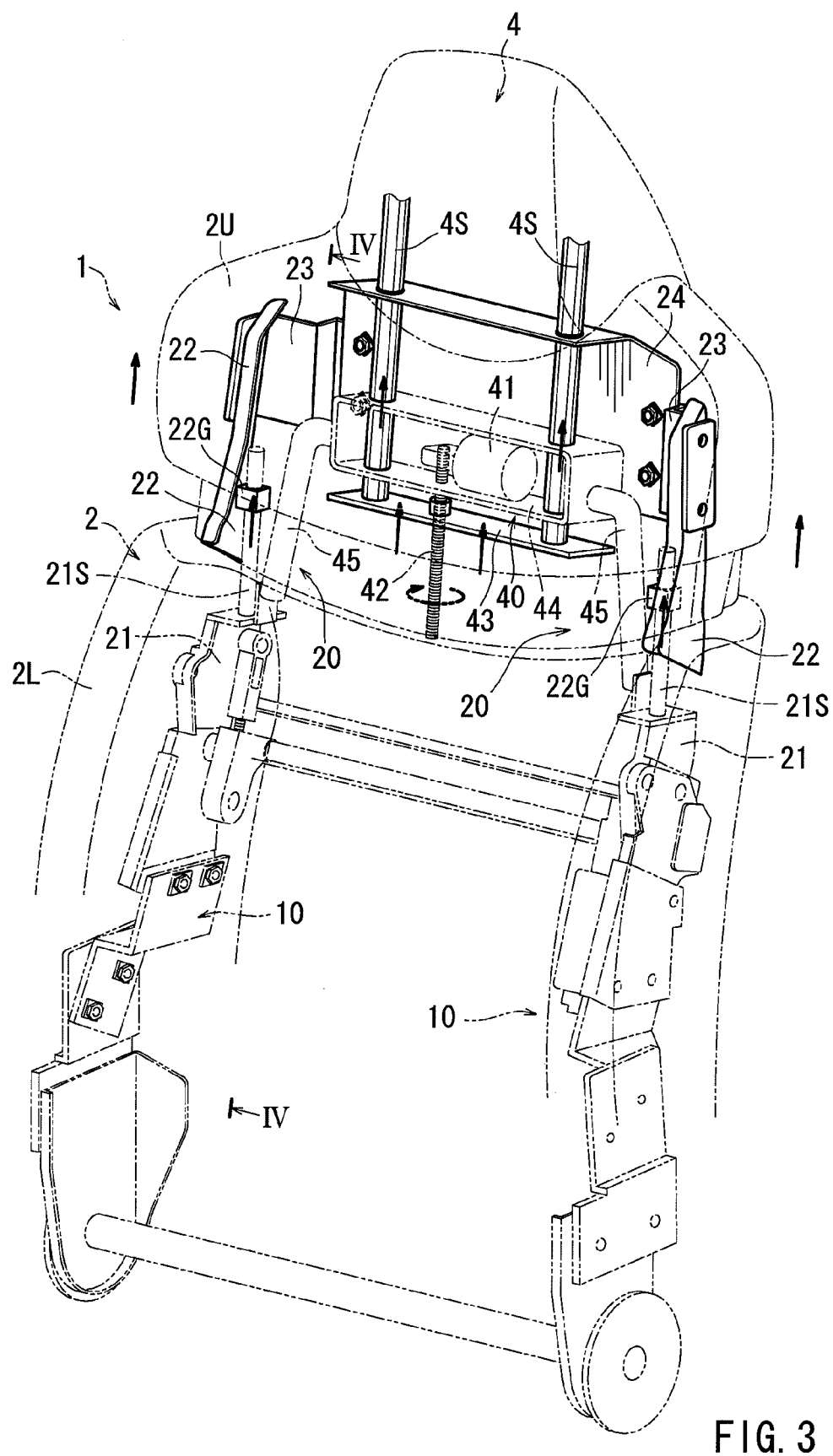
FIG. 3 is a perspective view similar to FIG. 2, which illustrates motion of the seat back upper half for extending a whole vertical length of the vehicle seat.

As best shown in FIG. 3, the head rest stays 4S are integrated with or welded to the reinforcement plate 24. Therefore, when the lifting base 43 is vertically moved along the screw rod 42, the reinforcement plate 24 integrated with the head rest stays 4S can be vertically moved relative to the main body 44 (i.e., relative to the rotatable plates 21). As a result, the liftable plates 22 that are integrated with the reinforcement plate 24 via the shouldered bracket plates 23 are vertically moved relative to the rotatable plate 21 along the guide rods 21S, so that the seat back upper half 2U can be vertically moved with the head rest 4 relative to the seat back lower half 2L. Therefore, the overall length of the seat back 2 can be adjusted for the body size of the passenger.

Thus, the upper half 2U is vertically moved relative to the lower half 2L, so that the overall length of the seat back 2 can be extended. However, in this structure, when the liftable plates 22 are vertically moved relative to the rotatable plate 21, the hinge connection (i.e., the connection of the rotatable plate 21 and the support plate 14 via the hinge pins 21a) is not vertically moved. Therefore, the upper half 2U can be vertically moved relative to the lower half 2L while the upper half 2U is vertically moved relative to the hinge connection (i.e., the intermediate folding position). That is, the overall length of the seat back 2 can be extended without raising the intermediate folding position thereof. Therefore, after the upper half 2U is moved upwardly in order to extend the overall length of the seat back 2, the upper half 2U can be tilted forwardly relative to the seat back lower half 2L in large radius of rotation about the hinge connection (the hinge pins 21a).

According to the vehicle seat 1 of the present embodiment, the seat back 2 can be intermediately folded by the angular adjustment mechanisms. Further, the overall height or length of the seat back 2 can be changed by the upper half height adjustment mechanisms, so that the seat back 2 can be adjusted for body size of the passenger.

The upper half height adjustment mechanisms may function to raise the seat back upper half 2U relative to the intermediate folding position, thereby raising the upper half 2U relative to the lower half 2L. Therefore, after the upper half 2U is moved upwardly in order to extend the overall length of the seat back 2, the upper half 2U can be tilted forwardly in large radius of rotation. As a result, the seat back 2 may preferably be adjusted without tilting the upper half forwardly over a large angle range.

Also, the angular adjustment mechanisms and the upper half height adjustment mechanisms are respectively positioned on widthwise both sides of the seat back 2 in pairs. Therefore, the seat back upper half 2U can be smoothly tilted or raised relative to the seat back lower half 2L.

Second Detailed Representative Embodiment

Figure 5:
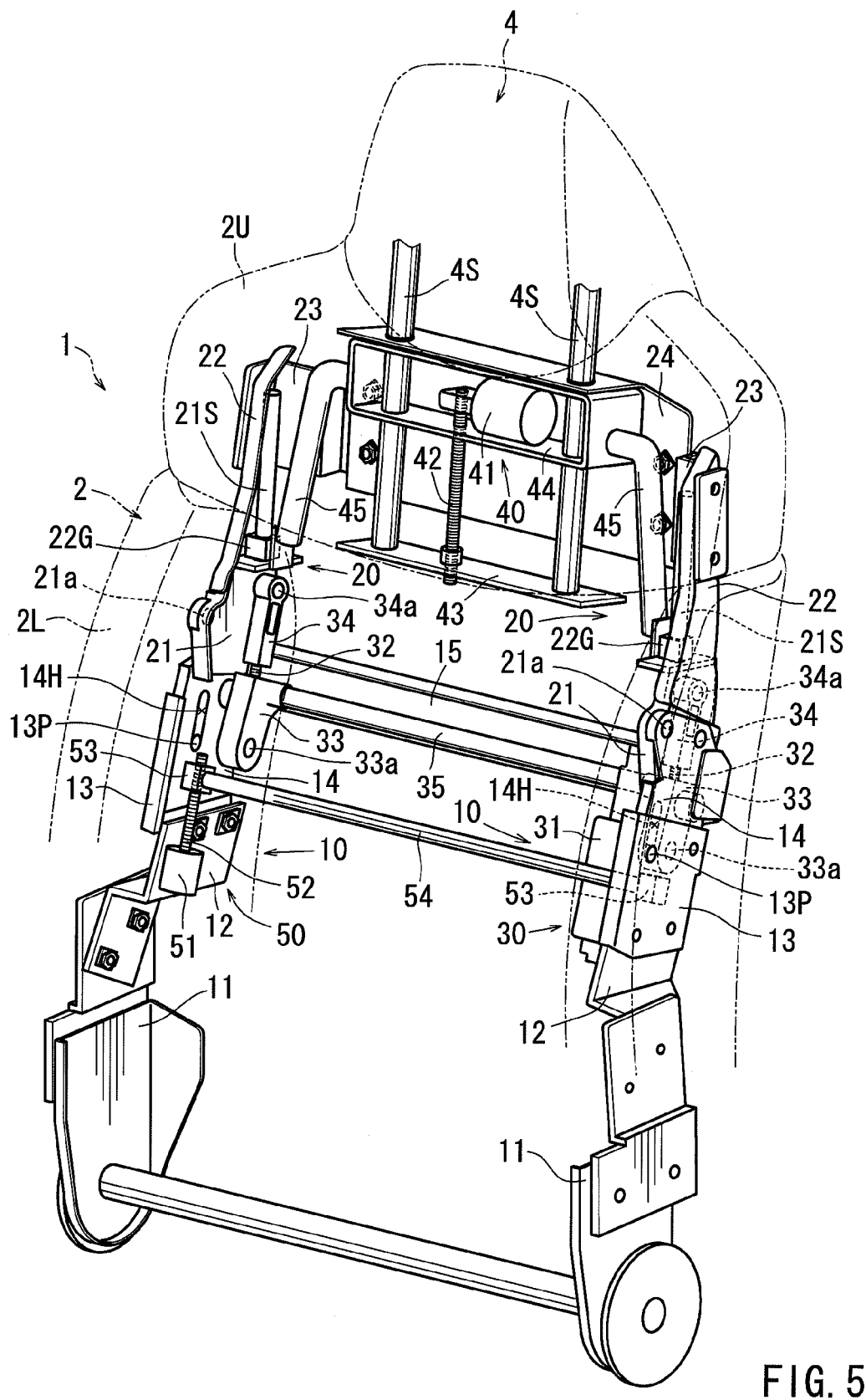
FIG. 5 is a perspective view of a vehicle seat according to a second representative embodiment of the present invention, which illustrates a framework or inner structure thereof.

The second detailed representative embodiment will now described in detail with reference to FIG. 5.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, unlike the first embodiment, an intermediate folding position adjustment mechanism is additionally disposed in the lower half 2L. The intermediate folding position adjustment mechanism is arranged and constructed to vertically move the intermediate folding position, so that the overall length of the seat back 2 can be further changed (extended). That is, the intermediate folding position adjustment mechanism is arranged and constructed to vertically move the hinge pins 21a that pivotally connect the rotatable plates 21 of the upper frames 20 and the support plates 14 of the lower frames 10, so that the upper half 2U can be further vertically moved (raised) relative to the lower half 2L.

In particular, each of the lower frames 10 is modified, thereby forming a substantial portion of the intermediate folding position adjustment mechanism. That is, the support plate 14 is vertically slidably coupled to the intermediate plate 13. Also, a vertically elongated slot 14H is formed in the support plate 14. Conversely, an inwardly projected pin 13P is formed in the intermediate plate 13. The pin 13 movably engages the elongated slot 14H, so that the support plate 14 can vertically slidably move relative to the intermediate plate 13 along the elongated slot 14H.

The intermediate folding position adjustment mechanism may preferably include a lower vertically moving device 50. The lower vertically moving device 50 is composed of a drive motor 51, a screw rod 52, a pair of guide members 53 and a lateral coupling shaft 54.

The drive motor 51 may preferably be attached to one of the bracket plates 12 that are integrally connected to the intermediate plates 13 (the left bracket plate 12 as seen in the drawings). The screw rod 52 is connected to the drive motor 51, so as to be rotated when the drive motor 51 is actuated. The guide members 53 are respectively attached to the support plates 14. Further, the screw rod 52 is upwardly extended and threadably engages the corresponding guide member 53 (the left guide member 53 as seen in the drawings), so that the (left) guide member 53 can be vertically moved when the screw rod 52 is rotated by the drive motor 51.

Further, the left and right guide members 53 are integrally connected to each other via the lateral coupling shaft 54. Therefore, the guide members 53 can be integrally vertically moved when the screw rod 52 is rotated by the drive motor 51, so that the support plates 14 can be integrally vertically moved relative to the intermediate plates 13. At this time, the hinge pins 21a that pivotally connect the rotatable plates 21 of the upper frames 20 and the support plates 14 is vertically moved and as a result, the upper frames 20 can be vertically moved relative to the lower frames 10. Thus, the upper half 2U is vertically moved relative to the lower half 2L, so that the overall length of the seat back 2 can be changed.

According to the vehicle seat 1 of the second embodiment, the intermediate folding position adjustment mechanism can vertically upwardly move the intermediate folding position, thereby vertically moving the upper half 2U relative to the lower half 2L. Therefore, the overall length of the seat back 2 can be further extended. As a result, the seat back 2 can be further precisely adjusted for body size of the passenger.

Naturally, various changes and modifications may be made to the present invention without departing from the scope of the invention. For example, in the embodiments, the screw rods 32, the guide members 33, the operation members 34 of the upper half tilting device 30 may preferably be provided in pairs. However, one of these members can be omitted, if necessary. Similarly, in the second embodiment, one of the guide members 53 of the lower vertically moving device 50 can be omitted, if necessary.

Further, in the embodiments, the upper half height adjustment mechanisms (the liftable plates 22) are arranged and constructed to be moved by means of the vertically moving device 40 of the head rest height adjustment mechanism. However, the upper half height adjustment mechanisms can be arranged and constructed to be moved by means of a special moving device, if necessary. In this case, it is preferred that the special moving device is constructed so as to be actuated in synchronism with the vertically moving device 40.

What is claimed is:

1. A vehicle seat having a seat back, the seat back comprising:
an upper half corresponding to a shoulder portion of a passenger;
a lower half corresponding to a waist portion of the passenger;
at least one angular adjustment mechanism that is disposed between the upper half and the lower half and includes at least one screw rod to tilt the upper half back and forth relative to the lower half, so as to intermediately fold the seat back at an intermediate folding position;
at least one upper half height adjustment mechanism that is disposed in the upper half and is arranged and constructed to vertically move the upper half relative to the intermediate folding position, and
an intermediate folding position adjustment mechanism that is disposed in the lower half and is arranged and constructed to vertically move the intermediate folding position relative to the lower half.

2. The vehicle seat as defined in claim 1, wherein the at least one angular adjustment mechanism is formed by rotatably connecting an upper frame corresponding to the upper half and a lower frame corresponding to the lower half to each other via a hinge connection.

3. The vehicle seat as defined in claim 2, wherein the at least one upper half height adjustment mechanism is formed by dividing the upper frame to a hinge-connection portion that is hinge connected to the lower frame and a vertical moving portion that is capable of vertically moving relative to the hinge-connection portion.

4. The vehicle seat as defined in claim 3, wherein the vertical moving portion is arranged and constructed to be vertically moved via a vertically moving device, so as to vertically move relative to the hinge-connection portion.

5. The vehicle seat as defined in claim 1, wherein the at least one angular adjustment mechanism comprises a pair of angular adjustment mechanisms that are arranged and constructed to be actuated in synchronism with each other.

6. The vehicle seat as defined in claim 5, wherein the at least one upper half height adjustment mechanism comprises a pair of upper half height adjustment mechanisms that are arranged and constructed to be actuated in synchronism with each other.

7. The vehicle seat as defined in claim 1, wherein the lower half comprises a lower frame having a first frame portion and a second frame portion, and wherein the first frame portion can vertically move relative to the second frame portion, so as to vertically move the intermediate folding position relative to the lower half.

* * * * *